United States Patent
Choi et al.

(10) Patent No.: US 9,668,316 B2
(45) Date of Patent: May 30, 2017

(54) BACKLIGHT UNIT AND DISPLAY DEVICE INCLUDING BACKLIGHT UNIT WITH OVERCURRENT PROTECTION

(71) Applicant: Samsung Display Co., Ltd., Yongin, Gyeonggi-Do (KR)

(72) Inventors: Seungyoung Choi, Yongin-si (KR); Dae-sik Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/749,220

(22) Filed: Jun. 24, 2015

(65) Prior Publication Data
US 2016/0183334 A1   Jun. 23, 2016

(30) Foreign Application Priority Data
Dec. 23, 2014 (KR) .................. 10-2014-0186999

(51) Int. Cl.
*H05B 33/08* (2006.01)
*G09G 3/00* (2006.01)
*G09G 3/34* (2006.01)

(52) U.S. Cl.
CPC ........... *H05B 33/0887* (2013.01); *G09G 3/00* (2013.01); *G09G 3/3406* (2013.01); *H05B 33/0815* (2013.01); *H05B 33/0827* (2013.01); *G09G 2330/08* (2013.01); *Y02B 20/341* (2013.01)

(58) Field of Classification Search
CPC .......................... H05B 33/083; H05B 33/0887
USPC ........................................................ 315/122
See application file for complete search history.

(56) References Cited

U.S. PATENT DOCUMENTS

| 8,947,343 B2 * | 2/2015 | Kim ...................... G09G 3/006 345/102 |
| 2011/0175547 A1 * | 7/2011 | Oh ..................... H05B 33/0827 315/294 |
| 2013/0015781 A1 * | 1/2013 | Kanemitsu ......... H05B 33/0815 315/291 |
| 2013/0113841 A1 * | 5/2013 | Choi .................. H05B 33/0815 345/690 |

(Continued)

FOREIGN PATENT DOCUMENTS

| KR | 10-2011-0015264 A | 2/2011 |
| KR | 10-2012-0010482 A | 2/2012 |

(Continued)

*Primary Examiner* — Dylan White
(74) *Attorney, Agent, or Firm* — Innovation Counsel LLP

(57) ABSTRACT

According to an exemplary embodiment, a backlight unit includes a plurality of light emitting strings, and a driving controller configured to detect source voltages of a plurality of light transistors provided in the light emitting strings. The driving controller is further configured to compare a source voltage of each of the light transistors with an overcurrent protection voltage and to turn off an operation of a corresponding light transistor having a source voltage level higher than the overcurrent protection voltage. The backlight unit further includes a first comparator configured to compare the source voltage of the corresponding light transistor with a reference source voltage to output a feedback voltage according to the compared result; and a first switch configured to electrically connect the first comparator to a gate terminal of the corresponding light transistor, wherein the first switch operates in response to an overcurrent protection signal.

13 Claims, 7 Drawing Sheets

(56) References Cited

U.S. PATENT DOCUMENTS

| | | | | |
|---|---|---|---|---|
| 2013/0147361 A1* | 6/2013 | Kang | ................... | H05B 33/089 315/122 |
| 2015/0042925 A1* | 2/2015 | Hu | ....................... | G09G 3/3406 349/69 |
| 2016/0081144 A1* | 3/2016 | Lee | ...................... | H05B 33/083 315/186 |

FOREIGN PATENT DOCUMENTS

| KR | 10-1282072 A | 1/2013 |
|---|---|---|
| KR | 10-2013-0027854 A | 3/2013 |
| KR | 10-2013-0063879 A | 6/2013 |

\* cited by examiner

BACKLIGHT UNIT AND DISPLAY DEVICE INCLUDING BACKLIGHT UNIT WITH OVERCURRENT PROTECTION

CROSS-REFERENCE TO RELATED APPLICATIONS

This U.S. non-provisional patent application claims priority under 35 U.S.C. §119 of Korean Patent Application No. 10-2014-0186999, filed on Dec. 23, 2014, the entire contents of which are hereby incorporated by reference.

BACKGROUND

The present disclosure herein relates to a display device, and more particularly, to a display device including a backlight unit.

A display device includes a display panel for displaying an image and a gate driving unit and a data driving unit for driving the display panel. The display panel includes a plurality of gate lines, a plurality of data lines, and a plurality of pixels connected to the gate lines and the data lines. The gate lines receive gate signals from the gate driving unit. The data lines receive data voltages from the data driving units. The pixels receive the data voltages through the data lines in response to the gate signals received through the gate lines. The pixels display gradations of light corresponding to the date voltages to display an image.

Also, the display device includes a backlight unit for providing light to the display panel. The backlight unit may use a cold cathode fluorescent lamp (CCFL) or light emitting diodes (LEDs) as a light source for generating light.

A converter that is driven by direct current (DC) may be used to drive the LEDs. The backlight unit includes a DC-DC converter that receives a low DC voltage and outputs a high DC voltage to drive the LEDs. When at least one of the LEDs provided in the backlight unit is damaged, the backlight blocks the current supplied to the LEDs. Thus, the backlight unit may include a protection device for blocking the current supplied to the LEDs.

SUMMARY

The present disclosure provides a backlight unit that is capable of blocking current supplied to an LED when the LED is damaged and a display device including the backlight unit.

Embodiments of the present system and method provide backlight units including: a plurality of light emitting strings, each of which includes at least one light emitting diode and one light transistor that is electrically connected to the light emitting diode; and a driving controller configured to detect source voltages of a plurality of light transistors provided in the light emitting strings, wherein the driving controller is further configured to compare a source voltage of each of the light transistors with an overcurrent protection voltage and to turn off an operation of a corresponding light transistor having a source voltage level higher than the overcurrent protection voltage.

In some embodiments, the driving controller may include a plurality of operation parts configured to control operations of the light transistors, and each of the operation parts may be electrically connected to a corresponding light transistor.

In some embodiments, the operation part may include: a first comparator configured to compare the source voltage of the corresponding light transistor with a reference source voltage to output a feedback voltage according to the compared result; and a first switch configured to electrically connect the first comparator to a gate terminal of the corresponding light transistor, wherein the first switch may operate in response to an overcurrent protection signal.

In some embodiments, the first switch may be configured to turn on according to an activated state of the over-current protection signal to transmit the feedback voltage outputted from the first comparator to the gate terminal of the corresponding light transistor.

In some embodiments, the first switch may be configured to turn off according to a non-activated state of the over-current protection signal to block the feedback voltage outputted from the first comparator so that the feedback voltage is not transmitted to the gate terminal of the light transistor.

In some embodiments, the operation part may further include a second comparator configured to output the over-current protection signal, wherein the second comparator may output an activated overcurrent protection signal when the source voltage of the corresponding light transistor is higher than the overcurrent protection voltage.

In some embodiments, the operation part may further include a second switch connected to a gate node disposed between the first comparator and the first switch, wherein the second switch may be configured to transmit a full voltage to the gate node in response to a switching control signal.

In some embodiments, the second switch may be configured to turn on when the switching control signal is in an activated state so as to transmit the full voltage to the gate node.

In some embodiments, the driving controller may be configured to maintain the switching control signal in the activated state when the source voltage of the corresponding light transistor is less than the reference source voltage.

In some embodiments, the full voltage may have a voltage level higher than that of the feedback voltage.

In some embodiments, the backlight units may further include a comparison part configured to receive source voltages of the light transistors through the operation parts and to compare a selection voltage having the lowest voltage level of the received source voltages with a reference source voltage to output a comparison voltage according to the compared result; and a latch part configured to output a switching control signal to each of the operation parts in response to the comparison voltage, wherein the operation part may be configured to output one of the full voltage and the feedback voltage to the corresponding light transistor according to a state of the switching control signal.

In some embodiments, when the selection voltage is higher than the reference source voltage, the operation part may output the feedback voltage to the corresponding light transistor according to a compared result of the source voltage of the corresponding light transistor and the reference source voltage.

In some embodiments, when the selection voltage is less than the reference source voltage, the operation part may output a full voltage to the corresponding light transistor.

In some embodiments, the backlight units may further include a detection part configured to output a switching control signal to each operation part during a predetermined reference time period, wherein each operation part may be configured to output one of a full voltage and a feedback voltage to the corresponding light transistor in response to a state of the switching control signal.

In some embodiments, the reference time period may be set as a time period during which the source voltage of the corresponding light transistor increases from an initial voltage value to a value higher than the reference source voltage.

In some embodiments of the present system and method, display devices include: a display panel including a plurality of pixels configured to display an image; and a backlight unit configured to provide light to the pixels, wherein the backlight unit includes: a plurality of light emitting strings, each of which includes at least one light emitting diode and one light transistor that is electrically connected to the light emitting diode; and a driving controller configured to detect source voltages of a plurality of light transistors provided in the light emitting strings, wherein the driving controller is further configured to compare a source voltage of each of the light transistors with an overcurrent protection voltage to turn off an operation of a corresponding light transistor having a voltage level higher than the overcurrent protection voltage.

BRIEF DESCRIPTION OF THE DRAWINGS

The accompanying drawings are included to provide a further understanding of the present system and method, and are incorporated in and constitute a part of this specification. The drawings illustrate exemplary embodiments of the present system and method and, together with the description, serve to explain principles of the present system and method. In the drawings.

DETAILED DESCRIPTION OF THE EMBODIMENTS

Figure 1:
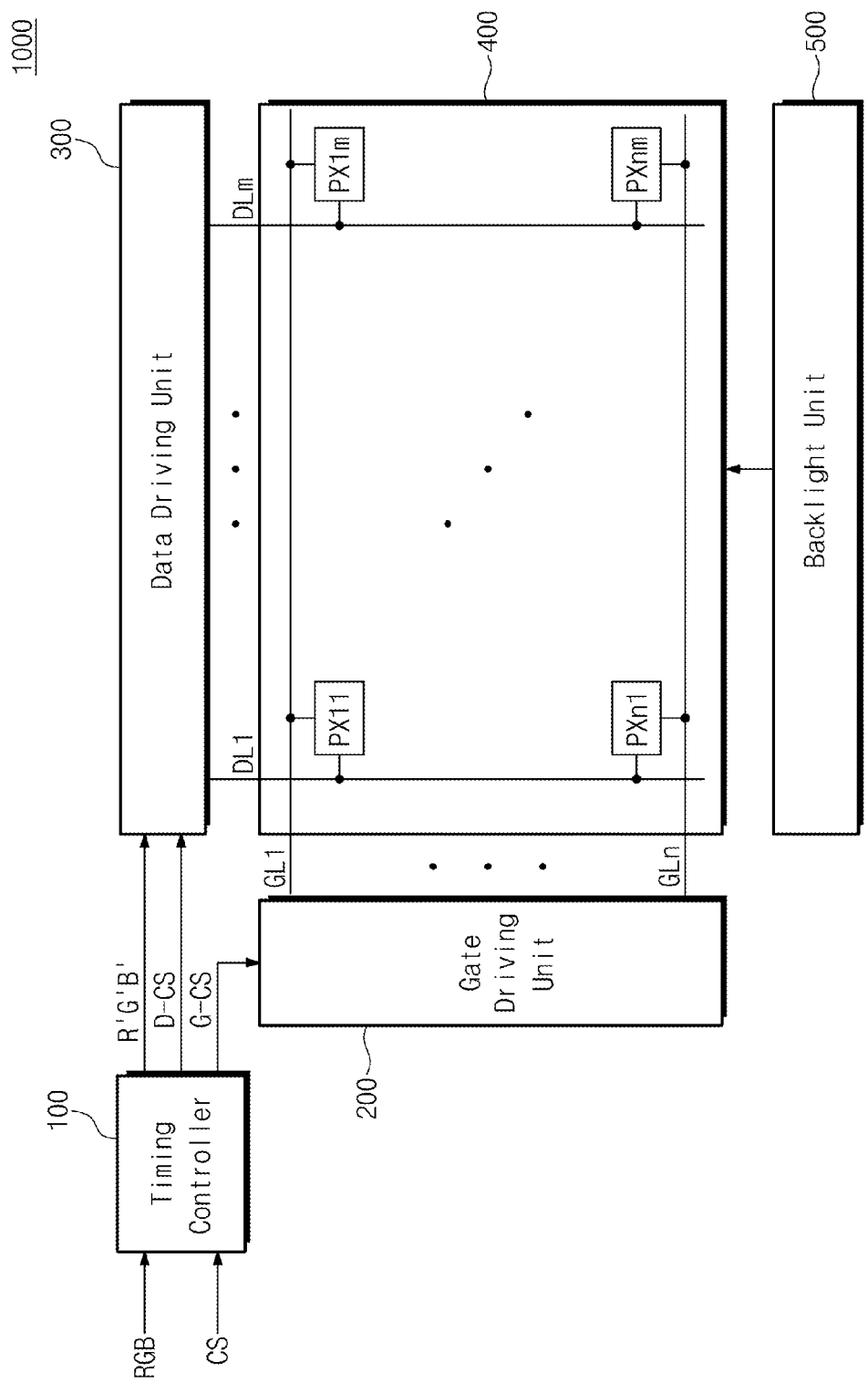
FIG. 1 is a block diagram of a display device according to an embodiment of the present system and method.

While certain embodiments are illustrated in the drawings and are described herein, the present disclosure may have diverse and modified embodiments. That is, the present system and method are not limited by the specific embodiments and cover all the modifications, equivalents, and replacements within the idea and technical scope of the teachings herein.

Like reference numerals refer to like elements throughout. In the drawings, the dimensions and size of each structure may be exaggerated, omitted, or schematically illustrated for convenience in description and clarity. Although the terms of "first" and "second" are used herein to describe various elements, these elements are not limited by these terms. These terms are only used to distinguish one component from other components. For example, an element referred to as a "first element" in one embodiment may be referred to as a "second element" in another embodiment. The terms of a singular form may include plural forms unless the context indicates otherwise.

The meaning of 'include' or 'comprise' specifies a property, a numeral, a step, an operation, an element or a combination thereof, but does not exclude other properties, numerals, steps, operations, elements or combinations thereof.

FIG. 1 is a block diagram of a display device according to an embodiment of the present system and method.

Referring to FIG. 1, a display device 1000 includes a timing controller 100, a gate driving unit 200, a data driving unit 300, a display panel 400, and a backlight unit 500.

The timing controller 100 receives a plurality of image signals RGB and a plurality of control signals CS from the outside of the display device 100. The timing controller 100 may convert the data format of the image signals RGB to match the interface specifications of the data driving unit 300. The image signals R'G'B' having the converted data format may be provided to the data driving unit 300.

The timing controller 100 generates a data control signal D-CS and a gate control signal G-CS in response to the control signals CS. For example, the data control signal D-CS may include an output start signal and a horizontal start signal. The gate control signal G-CS may include a vertical start signal and a vertical clock bar signal. The timing controller 100 transmits the data control signal D-CS to the data driving unit 300 and transmits the gate control signal G-CS to the gate driving unit 200.

The gate driving unit 200 may generate a plurality of gate signals in response to the gate control signal G-CS that is provided from the timing controller 100. The gate driving unit 200 may successively output the gate signals to the display panel 400 through a plurality of gate lines GL1 to GLn. A plurality of pixels PX11 to PXnm provided in the display panel 400 may be successively scanned in a row unit by the gate signals (i.e., gate signals may be successively applied to each pixel row).

The data driving unit 300 converts the image signals R'G'B' into a plurality of data voltages in response to the data control signal D-CS provided from the timing controller 100. The data driving unit 300 outputs the converted data voltages to the display panel 400 through a plurality of data lines DL1 to DLm.

The display panel 400 includes the gate lines GL1 to GLn, the data lines DL1 to DLm, and the pixels PX11 to PXnm. The gate lines GL1 to GLn extending in a row direction may be perpendicular to the data lines DL1 to DLm extending in a column direction. The gate lines GL1 to GLn may be electrically connected to the gate driving unit 200 to receive the gate signals. The data lines DL1 to DLm may be electrically connected to the data driving unit 300 to receive the data voltages. Each of the pixels PX11 to PXnm may be connected to a corresponding one of the gate lines GL1 to GLn and a corresponding one of the date lines DL1 to DLm.

The backlight unit 500 supplies light to the display panel 400. The backlight unit 500 may include a plurality of light emitting diodes (LEDs). In particular, according to an embodiment, the backlight unit 500 may include a plurality of light emitting strings (see FIG. 2) including the plurality of LEDs that are connected to each other in series.

The backlight unit 500 may DC-DC convert an input voltage applied from the outside into a driving voltage to generate light. However, when the input voltage is converted into the driving voltage to generate the light, an overcurrent phenomenon may occur. As a result, a portion of the plurality of LEDs may be broken.

According to an embodiment, when the backlight unit 500 is initially turned on, a damaged LED of the plurality of LEDs may be detected. An operation of each of the plurality of LEDs may be stopped according to the detection results. That is, the light may not be outputted from the plurality of LEDs.

Figure 2:
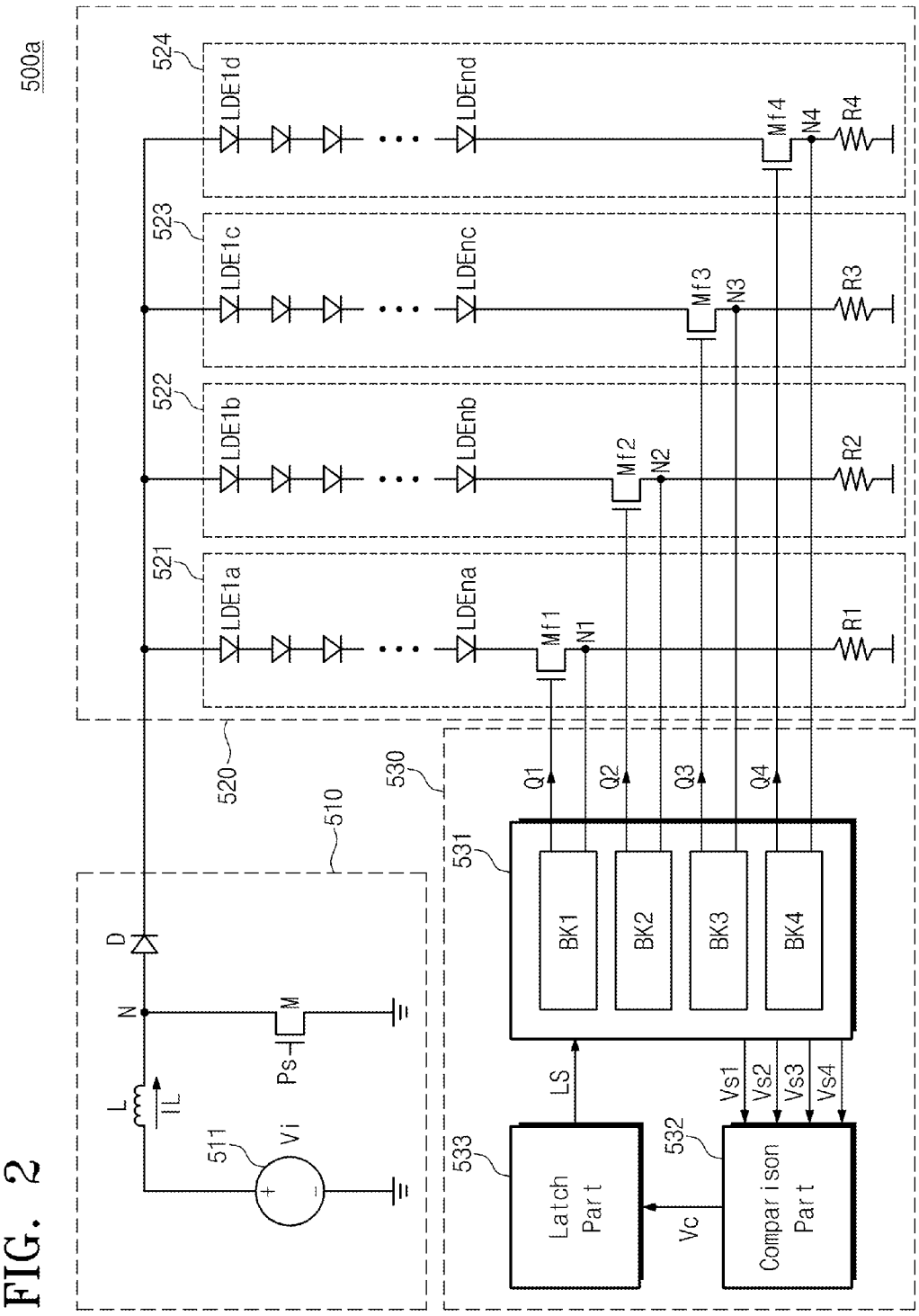
FIG. 2 is a circuit diagram of a backlight unit illustrated in FIG. 1.
Figure 3:
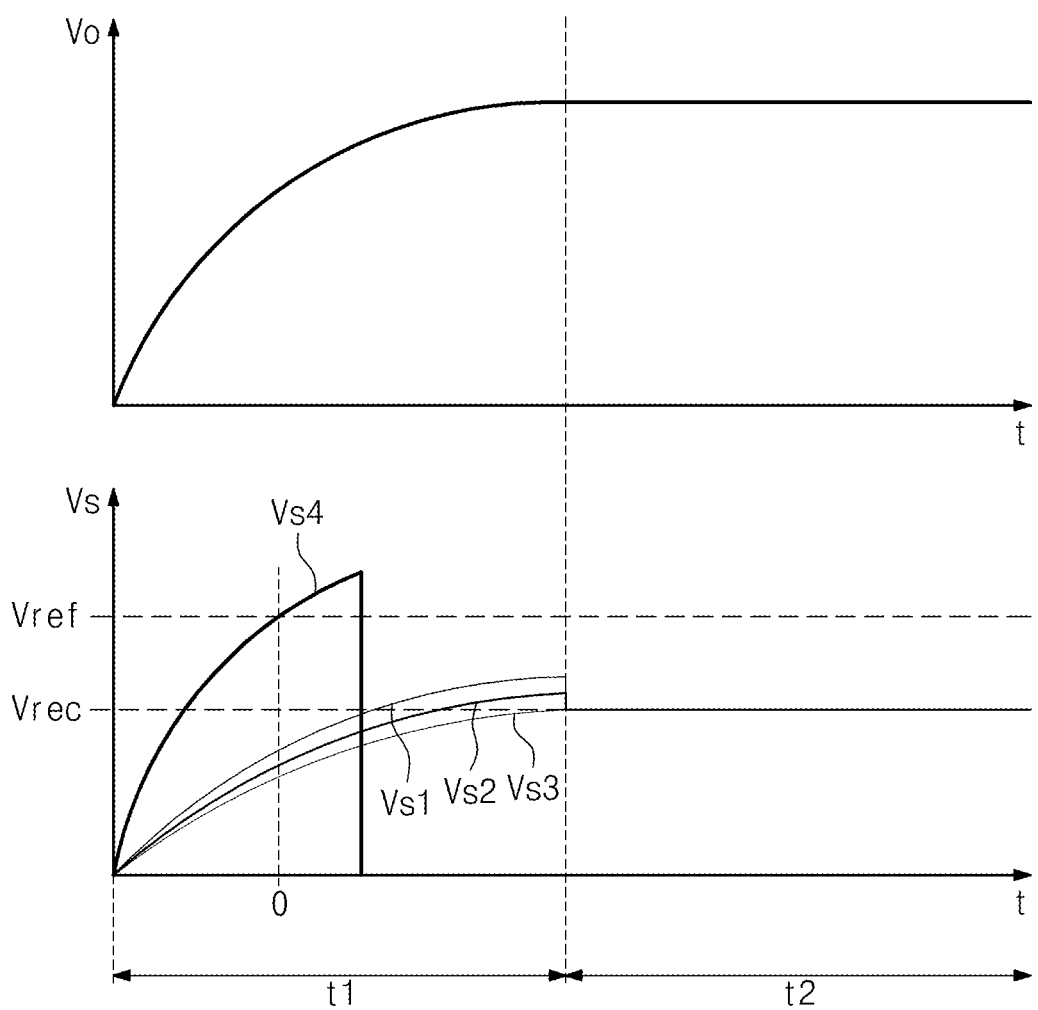
FIG. 3 is a timing graph illustrating an operation of a driving transistor illustrated in FIG. 2.

FIG. 2 is a circuit diagram of a backlight unit illustrated in FIG. 1. FIG. 3 is a timing graph illustrating an operation of a driving transistor illustrated in FIG. 2.

Referring to FIG. 2, the backlight unit 500a includes a DC-DC converter 510, a light source 520, and a driving controller 530.

The DC-DC converter 510 may receive an input voltage from the outside. The DC-DC converter 510 may convert the received input voltage into a driving voltage Vo that is used to operate the light source 520 and provide the converted driving voltage Vo to the light source 520.

In detail, the DC-DC converter 510 includes an input power source 511, an inductor L, a driving transistor M, and a diode D. The DC-DC converter 510 may convert the input voltage Vi into the driving voltage Vo that is used to drive the backlight unit 500a.

The input power source 511 is connected to a ground terminal and one end of the inductor L. The input power source 511 may generate the input voltage Vi, which is a DC component.

The inductor L has one end connected to the input power source 511 and another end connected to a driving node N. The inductor L may charge or output driving current IL generated by the input voltage Vi according to an operation of the driving transistor M.

The driving transistor M is realized as a NMOS transistor and disposed between the driving node N and the ground terminal. In detail, a drain terminal of the driving transistor M is connected to the driving node N, and a source terminal of the driving transistor M is connected to the ground terminal. Also, a gate terminal of the driving transistor M may operate in response to a dimming control signal Ps provided from the outside. For example, the dimming control signal Ps may be generated from a dimming generation part (not shown) and transmitted to the driving transistor M. The DC-DC converter 510 may adjust the voltage level of the driving voltage Vo in response to the dimming control signal Ps.

For example, when the driving transistor M is turned on in response to an activated dimming control signal Ps, the level of the driving current IL of the inductor L starts to rise according to the input voltage Vi. In this case, since the diode D is not turned on, the current IL outputted through the inductor L is not transmitted to an output terminal of the DC-DC converter 510. That is, the current IL outputted to the driving node N through the inductor L is transmitted to the ground through the turned-on driving transistor M.

On the other hand, when the driving transistor M is turned off in response to a non-activated dimming control signal Ps, the driving current IL charged in the inductor L is applied to the light source 520 through the diode D. In this case, the diode D is turned on and conducts a reduced level of the driving current IL of the inductor L to the output terminal of the DC-DC converter 510. Also, when the driving transistor M is turned off, the driving voltage Vo may increase due to the combination of the driving voltage of the inductor L and the input voltage Vi applied to the driving node N.

The light source 520 may receive the driving voltage Vo generated from the DC-DC converter 510. The light source 520 includes a plurality of light emitting strings 521 to 524. The light source 520 may generate light using the received driving voltage Vo. The light source 520 may provide the generated light to the display panel (see reference numeral 400 of FIG. 1).

In detail, the light source 520 includes first to fourth light emitting strings 521 to 524. Although the light source 520 includes the first to fourth light emitting strings 521 to 524, the present disclosure is not limited thereto. For example, the light source 520 may include any number of light emitting strings.

The first light emitting string 521 includes a plurality of first light emitting diodes LED1a to LEDna, a first light transistor Mf1 electrically connected to the first light emitting diodes LED1a to LEDna, and a first resistor R1.

The first light transistor Mf1 may be disposed between the first light emitting diodes LED1a to LEDna and a first node N1 to control an operation of the first light emitting diodes LED1a to LEDna. In detail, the first transistor Mf1 may control the operation of the first light emitting diodes LED1a to LEDna in response to a first gate voltage Q1 that is applied to a gate terminal.

For example, when an activated first gate voltage Q1 is applied, the first light transistor Mf1 is turned on. As a result, light may be outputted from the first light emitting diodes LED1a to LEDna in response to the driving voltage Vo. On the contrary, when a non-activated first gate voltage Q1 is applied, the first light transistor Mf1 is turned off. As a result, light may not be outputted from the first light emitting diodes LED1a to LEDna.

The first resistor R1 may be connected between the first node N1 and a ground terminal. A voltage level of the first node N1 may be set according to the resistance of the first resistor R1. Hereinafter, a voltage of the first node N1 is described as a source voltage of the first light transistor Mf1.

The second light emitting string 522 includes a plurality of second light emitting diodes LED1b to LEDnb, a second light transistor Mf2 electrically connected to the second light emitting diodes LED1b to LEDnb, and a second resistor R2. The third light emitting string 523 includes a plurality of third light emitting diodes LED1c to LEDnc, a third light transistor Mf3 electrically connected to the third light emitting diodes LED1c to LEDnc, and a third resistor R3. The fourth light emitting string 524 includes a plurality of fourth light emitting diodes LED1d to LEDnd, a fourth light transistor Mf4 electrically connected to the fourth light emitting diodes LED1d to LEDnd, and a fourth resistor R4.

Here, the first to fourth resistors R1 to R4 may have the same resistance. A voltage of each of the first to fourth nodes N1 to N4 may be a source voltage of each of the corresponding light transistors. Also, resistance of each of the first to fourth resistors R1 to R4 may be set on the basis of a reference source voltage that is used to drive the LEDs provided in each of the first to fourth light emitting strings 521 to 524. That is, when a source voltage of one of the first to fourth light transistors Mf1 to Mf4 reaches a reference source voltage, the driving controller 530 may control the first to fourth light transistors so that the source voltage of each of the first to fourth light transistors is maintained at the reference source voltage.

Since the second to fourth light emitting strings 522 to 524 have the same structure and operation method as those of the first light emitting string 521, a detailed description of the second to fourth light emitting strings 522 to 524 is omitted.

In general, when one of the plurality of LEDs provided in each of the strings is damaged, the operation of the backlight unit may be controlled and stopped to prevent overcurrent from occurring. For example, the LED may be broken due to short circuit.

According to an embodiment, when the backlight unit 500a is initially turned on, if it is determined that an LED is damaged, an operation of the light emitting string including the damaged LED may be stopped. Particularly, among the first to fourth light emitting strings 521 to 524, an operation of only the light emitting string including the damaged LED may be stopped.

The driving controller 530 may entirely control an operation of the light source 520. In particular, the driving controller 530 may control so that the operation of the corresponding light emitting string including the damaged LED is stopped. In detail, the driving controller 530 includes an operation part 531, a comparison part 532, and a latch part 533.

The operation part 531 includes a plurality of first to fourth driving blocks BK1 to BK4. According to an embodiment, the operation part 531 may include a plurality of driving blocks corresponding to the plurality of light emitting strings provided in the light source 520. That is, each driving block of the operation part 531 may be electrically connected to one light emitting string.

The first driving block BK1 may receive a first source voltage Vs1 of the first light transistor Mf1 and output a first gate voltage Q1 to the first light transistor Mf1 in response to the received first source voltage Vs1.

The second driving block BK2 may receive a second source voltage Vs2 of the second light transistor Mf2 and output a second gate voltage Q2 to the second light transistor Mf2 in response to the received second source voltage Vs2.

The third driving block BK3 may receive a third source voltage Vs3 of the third light transistor Mf3 and output a third gate voltage Q3 to the third light transistor Mf3 in response to the received third source voltage Vs3.

The fourth driving block BK4 may receive a fourth source voltage Vs4 of the fourth light transistor Mf4 and output a fourth gate voltage Q4 to the fourth light transistor Mf4 in response to the received fourth source voltage Vs4.

According to an embodiment, each of the first to fourth driving blocks BK1 to BK4 may output one of a full voltage and feedback voltage as a gate voltage to a corresponding gate terminal of each of the first to fourth light transistor Mf1 to Mf4.

Figure 4:
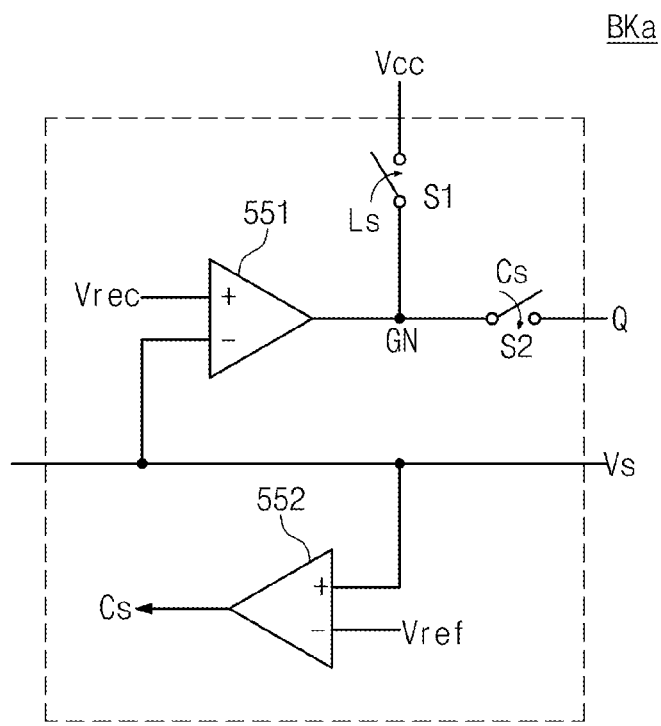
FIG. 4 is a circuit diagram of a comparison block provided in an operation part illustrated in FIG. 2.

In detail, referring to FIGS. 3 and 4, in a first operation period t1, each of the first to fourth source voltages Vs1 to Vs4 of the first to fourth transistors Mf1 to Mf4 may increase in voltage level in response to the driving voltage Vo outputted from the DC-DC converter 510. In this case, each of the first to fourth source voltages Vs1 to Vs4 may increase to a reference source voltage Vrec to operate the LEDs provided in each of the light emitting strings.

Also, in the first operation period t1, each of the first to fourth driving blocks BK1 to BK4 may continuously output the full voltage to the gate terminal of each of the first to fourth light transistors Mf1 to Mf4. Here, a level of the full voltage may be a voltage level sufficient to turn on any one of the first to fourth light transistors Mf1 to Mf4.

A second operation period t2 may correspond to a time period in which each of the first to fourth source voltages Vs1 to Vs4 has reached the reference source voltage Vrec. During the second operation period t2, each of the driving blocks may continuously output the feedback voltage so that the source voltage is maintained at the reference source voltage Vrec. Here, the feedback voltage may be a voltage that is feedback to the gate terminal of the light transistor from each of the driving blocks through comparison between the source voltage of the light transistor and the reference source voltage Vrec. The full voltage may have a voltage level higher than that of the feedback voltage.

Hereinafter, for example, at least one of the light emitting diodes LED1d to LEDnd provided in the fourth light emitting string 524 is damaged. In this case, the fourth source voltage Vs4 of the fourth light transistor Mf4 may further increase in comparison to the first to third source voltages Vs1 to Vs3 of the first to third light transistors Mf1 to Mf3 because the driving current outputted from the DC-DC converter 510 is not used in the damaged LED to increase a driving current applied to a drain terminal of the fourth light transistor Mf4. As a result, in the first operation period t1, when the full voltage is outputted to the gate terminal of each of the light transistors, the fourth source voltage Vs4 may further increase in voltage level, such as shown in FIG. 3.

Also, according to an embodiment, the driving block may compare the source voltage of the light transistor with an overcurrent protection voltage Vref to control whether to output a gate voltage to the gate terminal according to the compared results.

As exemplified above, since the LED of the fourth light emitting string 524 is damaged, the fourth source voltage Vs4 may increase higher than the overcurrent protection voltage Vref at a damaged time O. In this case, since the fourth source voltage Vs4 increases further than the overcurrent protection voltage Vref, the fourth driving block BK4 may control the fourth light transistor Mf4 so that the operation of the fourth light transistor Mf4 is stopped. That is, the fourth driving block BK4 may control the fourth light transistor Mf4 so that the full voltage is not outputted to the gate terminal of the fourth light transistor Mf4. As a result, the operation of the fourth light emitting string 524 is stopped and light is not outputted.

The comparison part 532 may receive the first to fourth source voltages Vs1 to Vs4 of the first to fourth light transistors Mf1 to Mf4 through the operation part 531. The comparison part 532 may compare a source voltage having the lowest voltage level of the received first to fourth voltages Vs1 to Vs4 with the reference source voltage Vrec to output a comparison voltage Vc to the latch part 533 according to the compared results.

The latch part 533 may output a switching control signal Ls in response to the comparison voltage Vc received through the comparison part 532. The latch part 533 may output the switching control signal Ls to the first to fourth driving blocks BK1 to BK4. The first to fourth driving blocks BK1 to BK4 may output a full voltage or a feedback voltage to the first to fourth light transistors Mf1 to Mf4 in response to the switching control signal Ls.

For example, the latch part 533 may output activated and non-activated switching control signals Ls according to the comparison voltage Vc received through the comparison part 532. The driving block outputs the full voltage to the light transistor in response to the activated switching control signal Ls. Also, the driving block outputs the feedback voltage to the light transistor in response to the non-activated switching control signal Ls.

FIG. 4 is a circuit diagram of a comparison block provided in an operation part illustrated in FIG. 2.

Referring to FIG. 4, the driving block BKa may be one of the first to fourth driving blocks BK1 to BK4 illustrated in FIG. 2. Each of the first to fourth driving blocks BK1 to BK4 may be realized by the same structure and operation method as the driving block illustrated in FIG. 4.

In detail, the driving block BKa includes a first comparator 551, a first switch S1, a second switch S2, and a second comparator 552.

The first comparator 551 may receive the reference source voltage Vrec through a first terminal (+) and the source voltage Vs of the light transistor that is electrically connected thereto through a second terminal (−). Also, the first comparator 551 may compare the source voltage Vs with the reference source voltage Vrec to output a feedback voltage according to the compared results to a gate node GN.

The first switch S1 may be disposed between a power terminal and the gate node GN. The second switch S2 may be disposed between the gate node GN and the gate terminal of the light transistor.

According to an embodiment, the first switch S1 may operate in response to the switching control signal Ls outputted from the latch part (see reference numeral 533 of FIG. 2). The switch control signal Ls may be maintained in an activated state in the first operation period t1 that is described above in FIG. 3 and maintained in a non-activated state in the second operation period t2.

For example, the first switch S1 is turned on in response to the activated switching control signal Ls. In this case, a full voltage VCC may be applied to the gate node GN through the first switch S1. As a result, the full voltage VCC applied through the first switch S1 may be applied to the gate terminal of the light transistor through the second switch S2. That is, when the first switch S1 is turned on, the feedback voltage outputted from the first comparator 551 may not be applied, but the full voltage VCC may be applied to the second switch S1 as the gate voltage Q.

Also, the first switch S1 is turned off in response to the non-activated switching control signal Ls. When the first switch S1 is turned off, the feedback voltage outputted from the first comparator 551 may be applied to the second switch S2.

The second switch S2 may operate in response to the overcurrent protection signal Cs. The second switch S2 may be turned on in response to the activated overcurrent protection signal Cs and be turned off in response to the non-activated overcurrent protection signal Cs. The overcurrent protection signal Cs may be outputted from the second comparator 552.

The second comparator 552 may receive the overcurrent protection voltage Vref through a first terminal (−) and the source voltage Vs of the light transistor that is electrically connected thereto through a second terminal (+). The second comparator 552 may compare the overcurrent protection voltage Vref with the source voltage Vs to output an overcurrent protection signal Cs according to the compared results.

For example, when the source voltage Vs exceeds the overcurrent protection voltage Vref, the second comparator 552 may output a non-activated overcurrent protection signal Cs. As a result, the gate voltage Q is not applied to the gate terminal of the light transistor, and thus an operation of the corresponding light emitting string may be stopped.

For example, when the source voltage Vs does not exceed the overcurrent protection voltage Vref, the second comparator 552 may output an activated overcurrent protection signal Cs. As a result, the gate voltage Q is applied to the gate terminal of the light transistor, and thus light may be continuously outputted from the corresponding light emitting string.

Figure 5:
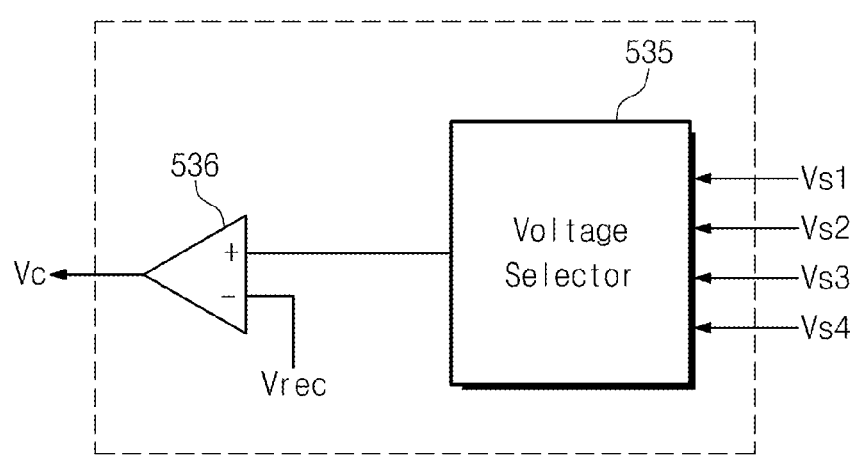
FIG. 5 is a circuit diagram of a latch part illustrated in FIG. 2.

FIG. 5 is a circuit diagram of a latch part illustrated in FIG. 2.

Referring to FIGS. 2 and 5, the comparison part 532 includes a source selector 535 and a source comparator 536.

The voltage selector 535 may receive the first to fourth source voltages Vs1 to Vs4 of the first to fourth light transistors Mf1 to Mf4. According to an embodiment, the voltage selector 535 may output a source voltage having the lowest voltage level of the received first to fourth source voltages Vs1 to Vs4 to the source comparator 536. Hereinafter, the source voltage having the lowest voltage level of the first to fourth source voltages Vs1 to Vs4 may be described as a selection voltage.

The source comparator 536 may receive the reference source voltage Vrec through a first terminal (−) and a selection voltage through a second terminal (+). The source comparator 536 may compare the reference source voltage Vrec with the selection voltage to transmit a comparison voltage Vc according to the compared results to the latch part 533.

In detail, the source comparator 536 may output one of first and second comparison voltages as the comparison voltage Vc according to the compared result of the selection voltage and the reference source voltage Vrec.

When the selection voltage is less than the reference source voltage Vrec, the source comparator 536 transmits the first comparison voltage to the latch part 533. The first comparison voltage may be a voltage level that is less than the reference source voltage Vrec. The first comparison voltage may be outputted during the first operation period t1 illustrated in FIG. 3. As a result, the latch part 533 may provide the activated switching control signal Ls to the first switch (see reference symbol S1 of FIG. 4) in response to the first comparison voltage. The first switch S1 may be turned on in response to the activated switching control signal Ls.

On the contrary, when the selection voltage reaches the reference source voltage Vrec, the source comparator 536 transmits the second comparison voltage to the latch part 533. The second comparison voltage may be the reference source voltage Vrec. Also, the second comparison voltage may be outputted during the second operation period t2 illustrated in FIG. 3. As a result, the latch part 533 may provide the non-activated switching control signal Ls to the first switch S1 in response to the second comparison voltage. The first switch S1 may be turned off in response to the non-activated switching control signal Ls.

Figure 6:
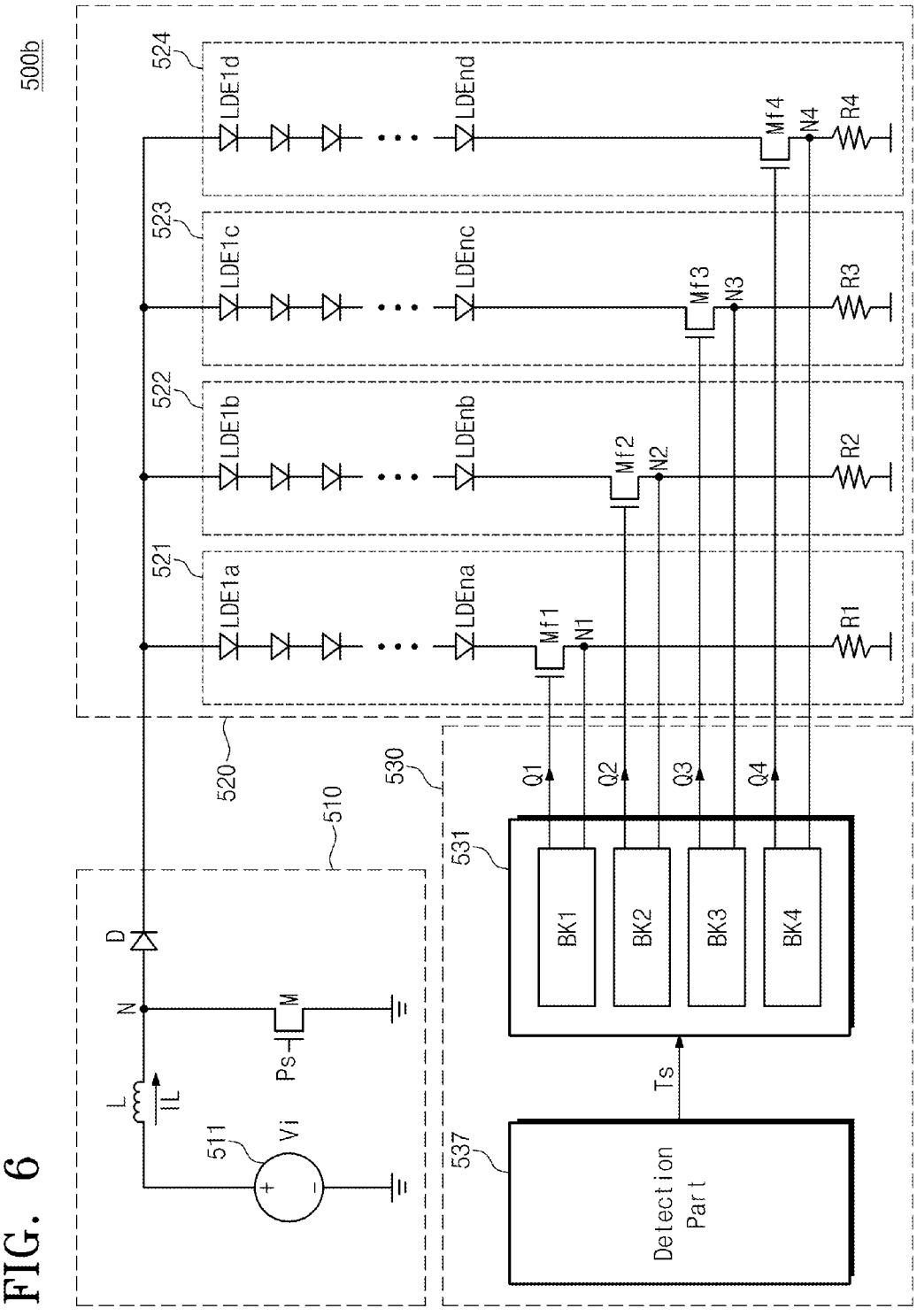
FIG. 6 is a block diagram of a display device according to another embodiment of the present system and method.
Figure 7:
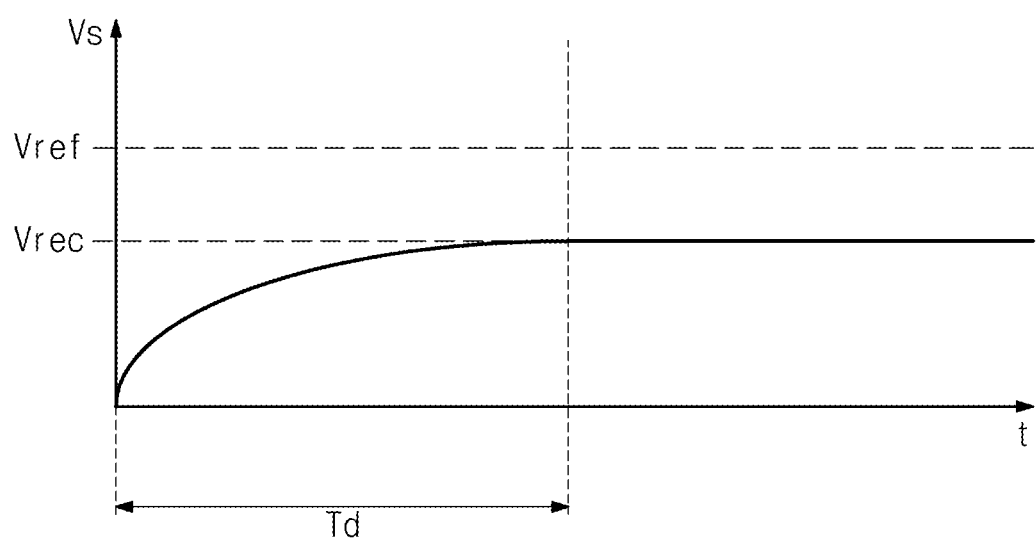
FIG. 7 is a timing graph illustrating a reference time of a detection part illustrated in FIG. 6.
Figure 8:
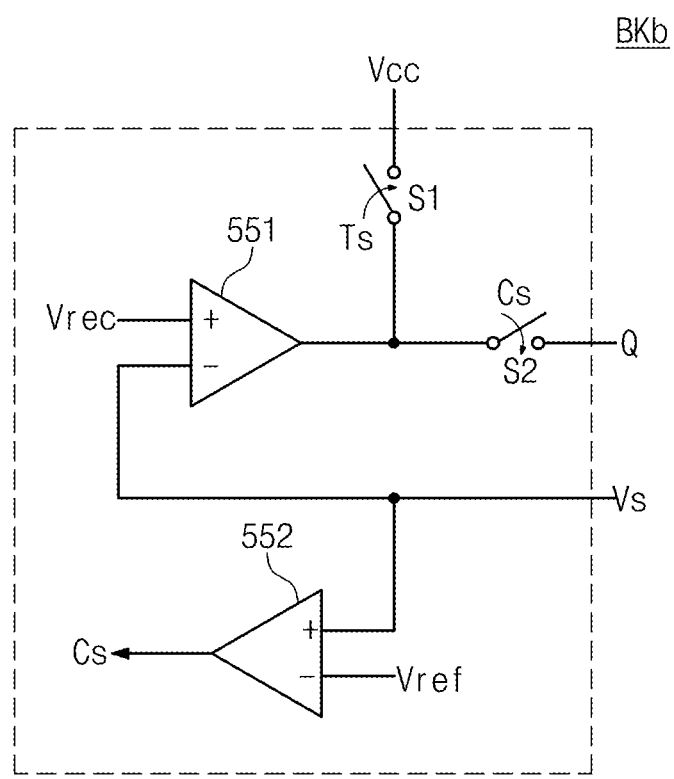
FIG. 8 is a circuit diagram of a comparison block provided in an operation part illustrated in FIG. 6.

FIG. 6 is a block diagram of a display device according to another embodiment of the present system and method. FIG. 7 is a timing graph illustrating a reference time of a detection part illustrated in FIG. 6. FIG. 8 is a circuit diagram of a comparison block provided in an operation part illustrated in FIG. 6.

Referring to FIG. 6, a backlight unit 500b according to another embodiment includes a DC-DC converter 510, a light source 520, and a driving controller 530.

The backlight unit 500b illustrated in FIG. 6 has a driving controller 530 that is different from the driving controller 530 in the backlight unit 500a illustrated in FIG. 2. Since each of the DC-DC converter 510 and the light source 520 provided in the backlight unit 500b has the same structure and operation method as those of the DC-DC converter 510 and the light source 520 of the backlight unit 500a illustrated in FIG. 2, a detailed description with respect to the structure and operation method thereof is omitted.

The driving controller 530 includes an operation part 531 and a detection part 537. Here, the operation part 531 has the same constitution as that of the operation part 531 illustrated in FIG. 2. As such, a detailed description of the operation part 531 is omitted.

According to an embodiment, the detection part 537 may output a switching control signal Ts that is provided to the first switch (see reference symbol S1 of FIG. 8) during a predetermined reference time period Td.

Referring to FIGS. 7 and 8, the reference time period Td may be set as a time corresponding to the first operation period t1 illustrated in FIG. 3. Thus, the detection part 537 may output an activated switching control signal Ts during the reference time period Td corresponding to the first operation period t1. As a result, the first switch S1 may be turned on, and thus the full voltage may be outputted to the gate node GN, during the reference time period Td.

Also, the detection part 537 may output a non-activated switching control signal Ts after the reference time period Td lapses. As a result, the first switch S1 may be turned off, and thus the feedback voltage may be outputted to the gate node GN from the first comparator 551 after the reference time period Td lapses.

As described above, according to an embodiment, it may be determined whether the LED provided in the light emitting string is damaged during the first operation period t1 after the backlight unit 500 is initially turned on. That is, since the source voltage of the light transistor that is electrically connected to the damaged LED increases higher than the overcurrent protection voltage, the operation of the corresponding light emitting string may be stopped. As a result, an overcurrent phenomenon in the light source 520 may be prevented to improve the driving reliability of the display device.

According to at least the above-described embodiments, among the plurality of light emitting strings that include at least one LED, the operation of the light emitting string including the damaged LED may be controlled. Particularly, when the LED is damaged, the operation of the light emitting string including the damaged LED may be stopped. Thus, the driving reliability of the display device may be improved.

Embodiments of the present system and method are disclosed in the drawings and this specification as described above. While specific terms were used to explain the present system and method, these terms do not limit the meaning or the scope of the present system and method as described in the claims. Accordingly, a person having ordinary skill in the art would understand from the above-discussion that various modifications and other equivalent embodiments are also possible.

What is claimed is:

1. A backlight unit comprising:
a plurality of light emitting strings, each of which comprises at least one light emitting diode and one light transistor that is electrically connected to the light emitting diode; and
a driving controller configured to detect source voltages of a plurality of light transistors provided in the light emitting strings,
wherein the driving controller is further configured to compare a source voltage of each of the light transistors with an overcurrent protection voltage and to turn off an operation of a corresponding light transistor having a source voltage level higher than the overcurrent protection voltage,
wherein the driving controller comprises a plurality of operation parts configured to control operations of the light transistors, and each of the operation parts is electrically connected to a corresponding light transistor, and
wherein the operation part comprises:
a first comparator configured to compare the source voltage of the corresponding light transistor with a reference source voltage to output a feedback voltage according to the compared result; and
a first switch configured to electrically connect the first comparator to a gate terminal of the corresponding light transistor,
wherein the first switch operates in response to an overcurrent protection signal.

2. The backlight unit of claim 1, wherein the first switch is configured to turn on according to an activated state of the over-current protection signal to transmit the feedback voltage outputted from the first comparator to the gate terminal of the corresponding light transistor.

3. The backlight unit of claim 1, wherein the first switch is configured to turn off according to a non-activated state of the overcurrent protection signal to block the feedback voltage outputted from the first comparator so that the feedback voltage is not transmitted to the gate terminal of the light transistor.

4. The backlight unit of claim 1, wherein the operation part further comprises a second comparator configured to output the overcurrent protection signal,
wherein the second comparator outputs an activated overcurrent protection signal when the source voltage of the corresponding light transistor is higher than the overcurrent protection voltage.

5. The backlight unit of claim 1, wherein the operation part further comprises a second switch connected to a gate node disposed between the first comparator and the first switch,
wherein the second switch is configured to transmit a full voltage to the gate node in response to a switching control signal.

6. The backlight unit of claim 5, wherein the second switch is configured to turn on when the switching control signal is in an activated state so as to transmit the full voltage to the gate node.

7. The backlight unit of claim 5, wherein the driving controller is configured to maintain the switching control signal in the activated state when the source voltage of the corresponding light transistor is less than the reference source voltage.

8. The backlight unit of claim 5, wherein the full voltage has a voltage level higher than that of the feedback voltage.

9. A backlight unit comprising:
a plurality of light emitting strings, each of which comprises at least one light emitting diode and one light transistor that is electrically connected to the light emitting diode;
a driving controller configured to detect source voltages of a plurality of light transistors provided in the light emitting strings,
wherein the driving controller is further configured to compare a source voltage of each of the light transistors with an overcurrent protection voltage and to turn off an operation of a corresponding light transistor having a source voltage level higher than the overcurrent protection voltage, and
wherein the driving controller comprises a plurality of operation parts configured to control operations of the light transistors, and each of the operation parts is electrically connected to a corresponding light transistor;
a comparison part configured to receive source voltages of the light transistors through the operation parts and to compare a selection voltage having the lowest voltage level of the received source voltages with a reference source voltage to output a comparison voltage according to the compared result; and a latch part configured to output a switching control signal to each of the operation parts in response to the comparison voltage, wherein the operation part is configured to output one of the full voltage and the feedback voltage to the corresponding light transistor according to a state of the switching control signal.

10. The backlight unit of claim 9, wherein, when the selection voltage is higher than the reference source voltage, the operation part outputs the feedback voltage to the corresponding light transistor according to a compared result of the source voltage of the corresponding light transistor and the reference source voltage.

11. The backlight unit of claim 9, wherein, when the selection voltage is less than the reference source voltage, the operation part outputs a full voltage to the corresponding light transistor.

12. A backlight unit comprising:
a plurality of light emitting strings, each of which comprises at least one light emitting diode and one light transistor that is electrically connected to the light emitting diode;
a driving controller configured to detect source voltages of a plurality of light transistors provided in the light emitting strings, wherein the driving controller is further configured to compare a source voltage of each of the light transistors with an overcurrent protection voltage and to turn off an operation of a corresponding light transistor having a source voltage level higher than the overcurrent protection voltage, and wherein the driving controller comprises a plurality of operation parts configured to control operations of the light transistors, and each of the operation parts is electrically connected to a corresponding light transistor;

a detection part configured to output a switching control signal to each operation part during a predetermined reference time period, wherein each operation part is configured to output one of a full voltage and a feedback voltage to the corresponding light transistor in response to a state of the switching control signal.

13. The backlight unit of claim 12, wherein the reference time period is set as a time period during which the source voltage of the corresponding light transistor increases from an initial voltage value to a value higher than the reference source voltage.

* * * * *